A. WETTERVIK.
RAIL CLEANING MACHINE.
APPLICATION FILED MAR. 29, 1920.
1,372,212.
Patented Mar. 22, 1921.
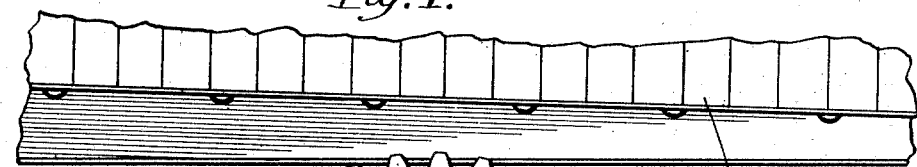
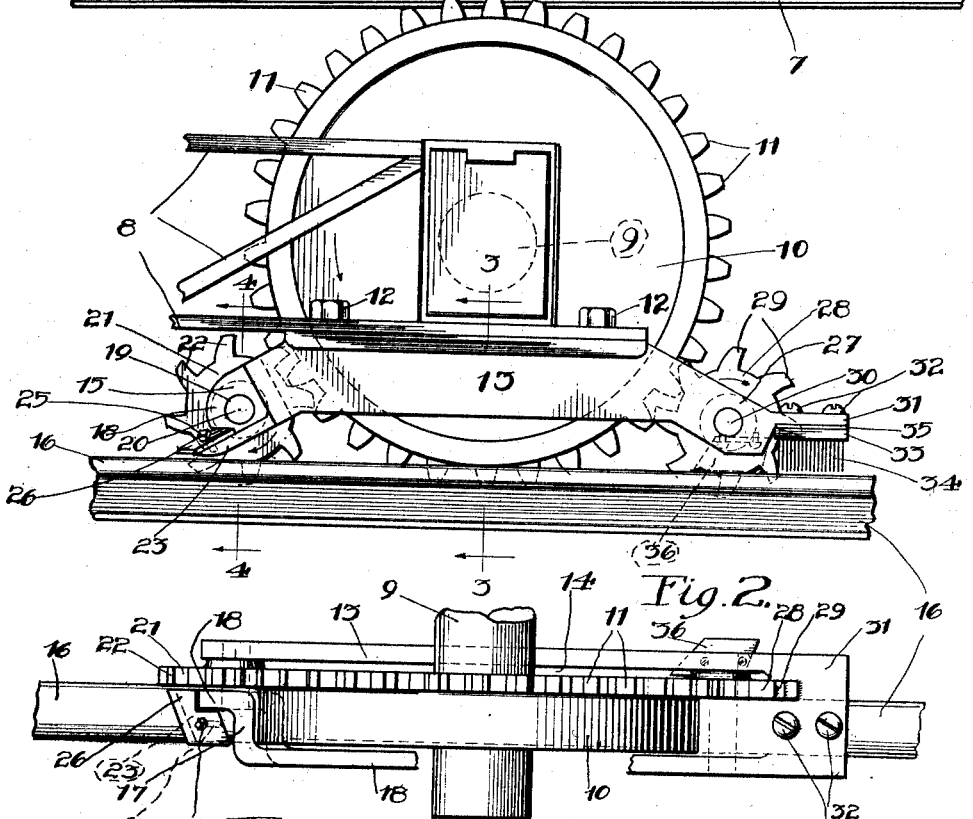
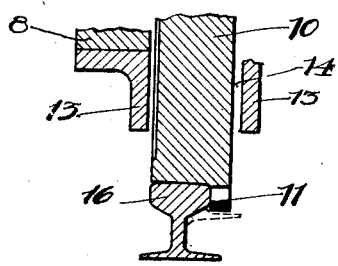
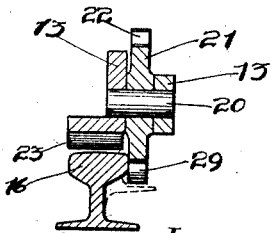
Witness
Geo L Lawrence
Inventor
Axel Wettervik
By Chas. C. Tillman
Atty.

UNITED STATES PATENT OFFICE.

AXEL WETTERVIK, OF IRON RIVER, MICHIGAN.

RAIL-CLEANING MACHINE.

1,372,212.        Specification of Letters Patent.        Patented Mar. 22, 1921.

Application filed March 29, 1920. Serial No. 369,623.

*To all whom it may concern:*

Be it known that I, AXEL WETTERVIK, a citizen of the United States, residing at Iron River, in the county of Iron and State of Michigan, have invented certain new and useful Improvements in Rail-Cleaning Machines, of which the following is a specification.

This invention relates to improvements in an apparatus to be used in connection with the body and running gear of a car for the purpose of cleaning or removing from the rails of the track, on which the car travels, accumulations of dirt, mud, ice, snow, sleet and the like, which would impede or impair the travel or progress of the car, and it consists in certain peculiarities of the construction, novel arrangement, combination and operation of the various parts thereof as will be hereinafter more fully set forth and specifically claimed.

The principal object of the invention is to provide a rail cleaning apparatus or machine which is applicable for use in cleaning the rails of the tracks of street cars or those of railways, which shall be simple and inexpensive in construction, strong, durable and effective in use, and which can be readily installed upon or applied to cars of the standard type or easily removed therefrom.

A further object is to provide a rail cleaning machine of such construction and operation of its parts, that but little, if any, additional power, over that used to propel the car to which it is applied, will be required, and which will so act as to dig up and lift the accumulations, such as dirt, and ice, on the inner sides of the rails, and at the same time will remove it from and prevent its lodgment on the top of the rails.

Other objects and advantages of the invention will be disclosed in the following description and explanation.

In the accompanying drawing, which serves to illustrate an embodiment of the invention—

Figure 1 is a view in side elevation of a portion of the body and a part of one of the truck frames of a car showing my improvements mounted on the latter.

Fig. 2 is a plan view of a portion of one of the car axles with a car wheel embodying a novel feature of the invention mounted thereon and showing the relative position of the supporting frame for the cleaning members with respect to said wheel.

Fig. 3 is a vertical sectional view taken on line 3—3 of Fig. 1 looking in the direction indicated by the arrows, and Fig. 4 is a similar view taken on line 4—4 of Fig. 1 as indicated by the arrows.

Like numerals of reference refer to corresponding parts throughout the different views of the drawing.

The reference numeral 7 designates as a whole the body of a car which may be equipped with a truck frame, which is also designated as a whole by the reference numeral 8, of the ordinary or well-known construction and arrangement.

Mounted on an axle 9 near each of its ends, which axle may be journaled on the truck frame 8 in the well known way, is a traction wheel 10 each of which has on the inner side of its periphery a series of radially disposed teeth or cogs 11 which take the place of the peripheral flanges on car wheels of the ordinary type. Otherwise, the wheels 10 of my invention are similar to those of the above mentioned car wheels.

Horizontally secured to the lower portion of the truck frame 8 by means of bolts and nuts 12 is a supporting frame which is designated as a whole by the numeral 13 which frame is provided with a longitudinally disposed slot 14 for the reception and operation of the lower portion of one of the car or traction wheels 10 as will be readily understood by reference to Figs. 1 and 2 of the drawings.

This frame is somewhat longer than the diameter of the wheel 10 and its peripheral teeth or cogs and as is clearly shown in Figs. 1 and 2 of the drawing, has its front end downwardly and forwardly inclined as shown at 15. The outer front portion of the frame 13 is extended inwardly to near the vertical plane of the outer surface of the teeth 11 of the wheel 10, or in other words, to near the inner side of the rail 16 on which the car wheel travels. From this inwardly or transversely extended portion 17 the front part of the outer portion of the supporting frame 13 is extended forwardly and downwardly as at 18 and said extension 18 is provided with a transverse opening or bearing 19 for the shaft 20 of a cleaning wheel 21 which shaft is also journaled in the front and downwardly inclined part of the inner side of the supporting frame. The wheel 21 is provided with a series of peripheral teeth 22 which are spaced apart in a proper way to mesh or engage with the teeth 11 of the car wheel. The teeth 22 on the wheel 21 are arranged with their front surfaces in about radial lines with the axis of the wheel so that in the revolution of said wheel in the direction of the arrow caused by the revolution of the car wheel in the direction of the arrow thereon, they will dig into and lift the accumulation of mud, dirt, ice and the like on the inner surface of the rails 16, along the inner side of which the wheel 21 operates.

In order to prevent the material thus dug up and lifted or thrown forwardly finding lodgment on the top of the rail 16, and in order to clean the upper surface of said rail, the transverse extension 17 and the forward extension 18 is provided with an inclined foot or rest 23 having a slot 24 for the reception of a screw-bolt 25 used for securing a scraper or blade 26 to the member or portion 23 at the desired distance at its front or lower end from the upper surface of the rail.

As shown in Figs. 1 and 2 the scraper or blade 26 is angularly disposed with reference to the rail so as to deflect and throw therefrom any substance or material lifted by the wheel 21 that might be deposited thereon. Furthermore, it will be seen and understood by reference to said views of the drawing that the member or portion 23 as well as the front edge of the blade 26 or scraper is located near the upper surface of the rail so as to remove obstructions from the latter. The blade or scraper 26 can be adjusted on its support or the member 23 by means of a screw-bolt 25 and a nut thereon coöperating with the slot 24 in said member. The rear portion of the frame 13 is downwardly and rearwardly inclined as at 27 and has located in the rear portion of the slot 14 of said frame another cleaning wheel 28 which is provided with teeth 29 constructed and arranged similarly as the teeth 22 on the wheel 21 and for a like purpose. This wheel is mounted on a shaft 30 transversely journaled in the frame 13 near the rear end of the slot or opening 14 between the sides of said frame and is so located as to operate near the inner surface of the rail 16 on which the car wheel 10 travels.

The rear end of the downwardly and rearwardly inclined portion 27 of the frame 13 is provided with a rearward horizontal extension 31 to the lower surface of which is adjustably secured by means of screw-bolts 32 extended through suitable openings in the extension 31, the back 33 of a wire brush 34 the bristles of which are located at their lower ends against or in close proximity to the upper surface of the track rail.

The position of the brush 34 can be vertically adjusted by inserting between the back 33 thereof and the extension 31 a shim 35 of suitable thickness when it is apparent that the back 33 of the brush may be securely fastened in place on the extension 31 by turning the screws 32 in the proper direction.

A scraper or deflector 36 is mounted on the rear and inner portion of the supporting frame 13 so as to catch and throw from the rail 16 material dug up and lifted by the action of the teeth 29 of the cleaning wheel 28 on the rear portion of the supporting frame.

While I have shown in the drawing the apparatus mounted on the truck frame of a car and have so described it, yet I desire it to be understood that the axle equipped with the wheels 10 and cleaning members can be mounted on a truck of a platform or vehicle of any suitable kind which can be caused to travel over the rails by any suitable means.

Having thus fully described my invention, what I claim as new and desire to secure by Letters Patent is—

1. In a device of the class described, the combination with an axle transversely journaled on a suitable support, of a pair of wheels mounted on said axle and adapted for travel on a pair of parallel track rails, each of said wheels having spaced teeth at the inner portion of its periphery, a frame horizontally and longitudinally disposed with respect to said rails and located along the lower portion of each of said wheels, and a cleaning wheel rotatably mounted on the inner portion of each of said frames near one end thereof and having peripheral teeth in mesh with the teeth of the first named wheels.

2. In a device of the class described, the combination with an axle transversely journaled on a suitable support, of a pair of wheels mounted on said axle and adapted for travel on a pair of parallel track rails, each of said wheels having spaced teeth at the inner portion of its periphery, a frame horizontally and longitudinally disposed with respect to said rails and located along the lower portion of each of said wheels and having its front end extended forwardly thereof, and a cleaning wheel rotatably mounted on the inner portion of the forwardly extended end of each of said frames and having peripheral teeth in mesh with the teeth of the first named wheels.

3. In a device of the class described, the combination with an axle transversely journaled on a suitable support, of a pair of wheels mounted on said axle and adapted for travel on a pair of parallel track rails, each of said wheels having spaced teeth at the inner portion of its periphery, a frame horizontally and longitudinally disposed with respect to said rails and located along the lower portion of each of said wheels, a cleaning wheel rotatably mounted on the inner portion of each of said frames near one end thereof and having peripheral teeth in mesh with the teeth of the first named wheels, and a blade angularly mounted on each of said frames outwardly of each of said cleaning wheels but adjacent thereto.

4. In a device of the class described, the combination with an axle transversely journaled on a suitable support, of a pair of wheels mounted on said axle and adapted for travel on a pair of parallel track rails, each of said wheels having spaced teeth at the inner portion of its periphery, a frame horizontally and longitudinally disposed with respect to said rails and located along the lower portion of each of said wheels and having its ends extended forwardly and rearwardly thereof, a cleaning wheel rotatably mounted on the inner portion of the front and rearwardly extended parts respectively of each of said frames and having peripheral teeth in mesh with the teeth of the first named wheels.

5. In a device of the class described, the combination with an axle transversely journaled on a suitable support, of a pair of wheels mounted on said axle and adapted to travel on a pair of parallel track rails, each of said wheels having spaced teeth at the inner portion of its periphery, a frame horizontally and longitudinally disposed with respect to said rails and located along the lower portion of each of said wheels and having its ends extended forwardly and rearwardly thereof, a cleaning wheel rotatably mounted on the inner portion of the front and rearwardly extended parts respectively of each of said frames and having peripheral teeth in mesh with the teeth of the first named wheels, a blade angularly mounted on the front end of each of said frames outwardly of each of the cleaning wheels on the front parts of said frames but adjacent thereto, a deflecting member angularly mounted on the rear portion of each of said frames inwardly of the cleaning wheel on said rear portions, and a brush mounted on the lower surface of the rear portion of each of said frames.

AXEL WETTERVIK.